US006218604B1

(12) United States Patent
Yamamoto

(10) Patent No.: US 6,218,604 B1
(45) **Date of Patent: *Apr. 17, 2001**

(54) TONE GENERATOR WITH DIVERSIFICATION OF WAVEFORM USING VARIABLE ADDRESSING

(75) Inventor: Takao Yamamoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,006

(22) Filed: Jul. 23, 1999

Related U.S. Application Data

(62) Division of application No. 09/232,348, filed on Jan. 15, 1999, now Pat. No. 5,942,708.

(30) Foreign Application Priority Data

Jan. 30, 1998 (JP) ................................................ 10-019716

(51) Int. Cl.[7] ............................ G09B 15/02; G10H 1/12; G10H 7/02

(52) U.S. Cl. ................................ 84/604; 84/622; 84/661; 84/477 R; 84/DIG. 9

(58) Field of Search .................... 84/603–607, 622–625, 84/661, 477 R, DIG. 9

(56) References Cited

U.S. PATENT DOCUMENTS 3,821,714 * 6/1974 Tomisawa et al. ................ 84/604 X
4,383,462 * 5/1983 Nagai et al. ........................... 84/604
4,622,877 * 11/1986 Strong ................................... 84/604
4,947,723 * 8/1990 Kawashima et al. .................. 84/603
5,225,619 * 7/1993 Sharp .................................... 84/604
5,430,241 * 7/1995 Furuhashi et al. ..................... 84/603
5,677,503 * 10/1997 Kurata ................................... 84/604

* cited by examiner

*Primary Examiner*—Stanley J. Witkowski
(74) *Attorney, Agent, or Firm*—Morrison & Foerster

(57) ABSTRACT

A music apparatus has a set of controls manually operable to input a performance event, a waveform memory storing an original waveform sample composed of a series of digital values sequentially readable from a default start address, and a processor for executing a tone generating process in response to the performance event. The tone generating process is executed by the steps of scanning the original waveform sample to determine a set of variational start addresses which are diverging from the default start address and which are allotted to corresponding ones of the controls, detecting an operated control among the plurality of the controls, specifying one of the variational start addresses corresponding to the operated control upon detection thereof, reading the original waveform sample from the specified variational start address to provide a variational waveform sample which is diversified from the original waveform sample uniquely to the specified variational start address, and synthesizing a musical tone unique to the operated control in accordance with the provided variational waveform sample and in response to the performance event.

20 Claims, 12 Drawing Sheets

TONE GENERATOR WITH DIVERSIFICATION OF WAVEFORM USING VARIABLE ADDRESSING

RELATED APPLICATION

This application is a divisional of application Ser. No. 09/232,348, filed Jan. 15, 1999, now issued as U.S. Pat. No. 5,942,708 on Aug. 24, 1999.

BACKGROUND OF THE INVENTION

1. Field of the Invention

The present invention relates to a tone generator, a waveform memory addressing method, and a machine readable medium suitable for use in generating tones in an electronic musical instrument or else.

2. Description of Related Art

A known sampler is constructed such that an analog tone signal is converted into a digital waveform sample composed of a series of digital values, then the same is stored in a waveform memory along a given range of addresses, and a desired music tone is reproduced based on the stored waveform sample. In such a sampler apparatus, a user specifies a read start address, a loop start address, and an end address of the waveform memory. When performance information is inputted, the waveform sample is read once from the read start address to the loop start address, followed by repeated reading of the waveform sample from the loop start address to the end address by the number of times corresponding to a duration of the music tone specified by performance information. Based on the waveform data thus read, the music tone is generated.

The above-mentioned read start address, loop start address, and end address may be changed to generate music tones of different variations based on one type of the waveform sample. However, to read waveform data of a different variation, the conventional sampler must set the addresses of the waveform data from a first step, making it impossible to generate music tones while changing their variations during the course of music performance.

SUMMARY OF THE INVENTION

It is therefore a first object of the present invention to provide a tone generator, a waveform memory addressing method, and a machine readable medium that are capable of generating as desired diverse variations of a music tone based on the same waveform sample.

It is a second object of the present invention to provide a tone generator, an addressing method, and a machine readable medium that are capable of setting two or more addresses to one type of a waveform sample by means of a user-friendly interface.

According to the invention, a tone generator apparatus comprises a waveform memory having addresses for storing a plurality of waveform samples, each waveform sample comprising a series of digital values located sequentially along the addresses, waveform selecting means for selecting the waveform samples stored in the waveform memory, an address memory for storing a set of start addresses in correspondence to each waveform sample, the start addresses specifying different addresses from which the same waveform sample is to be variably read out, address designating means for designating a default start address among the set of the start addresses to read out the waveform sample from the default start address, a set of controls manually operable to command generation of a musical tone, diversifying means for commanding whether or not to undergo diversification of the start address of the waveform sample, reading means operative when the diversification is not commanded for reading each waveform sample from the default address in response to operation of a corresponding control, and being operative when the diversification is commanded for reading the selected waveform sample from one start address selected from the set of the start addresses in correspondence to the operated control, and synthesizing means for synthesizing the musical tone according to the read waveform sample.

Preferably, the inventive tone generator apparatus further comprises a filter memory for storing a default filter parameter in correspondence to each waveform sample, and for storing a set of variational filter parameters, wherein the diversification means includes means for commanding whether or not to undergo diversification of a filtering process, and wherein the synthesizing means operates when the diversification of the filtering process is not commanded for undergoing the filtering process of the read waveform sample based on the default filter parameter, and operates when the diversification of the filtering process is commanded for applying the filtering process to the read waveform sample by using one of the variational filter parameters selected in correspondence to the operated one of the controls.

According to the invention, a method of determining a set of start addresses used for variably reading one waveform sample, comprises the steps of storing the waveform sample in a waveform memory, detecting a plurality of rising points involved in the waveform sample, quantizing a segment of the waveform sample around each rising point to evaluate a magnitude associated to each rising point, and sorting the detected rising points in terms of the magnitudes so as to select significant ones of the detected rising points to thereby determine the set of the start addresses.

According to the invention, a method of determining a set of start addresses used for variably reading one waveform sample in correspondence to a set of manual controls, comprises the steps of storing the waveform sample in a waveform memory along a range of addresses, sequentially reading the waveform sample form the range of the addresses to generate a musical tone, operating one of manual controls during the generation of the music tone, and capturing an instant address from the range in coincident with a timing of operating the manual control to thereby determine the start address in association with the operated manual control.

According to the invention, a machine readable medium is used in a music apparatus having a processor, a set of controls manually operable to input a performance event, and a waveform memory storing an original waveform sample composed of a series of digital values sequentially readable from a default start address. The medium contains program instructions executable by the processor for causing the music apparatus to perform a tone generating process in response to the performance event. The tone generating process comprises the steps of scanning the original waveform sample to determine a set of variational start addresses which are diverging from the default start address and which are allotted to corresponding ones of the controls, detecting an operated control among the plurality of the controls, specifying one of the variational start addresses corresponding to the operated control upon detection thereof, reading the original waveform sample from the specified variational start address to provide a variational waveform sample which is diversified from the original waveform sample uniquely to the specified variational start address, and synthesizing a musical tone unique to the operated control in accordance with the provided variational waveform sample and in response to the performance event.

Specifically, in the machine readable medium, the step of scanning comprises locating a plurality of rising points involved in the series of the digital values of the original waveform sample, quantizing a segment of the digital values around each rising point to evaluate a magnitude associated to each rising point, sorting the located rising points in terms of the magnitudes so as to select significant ones of the rising points to thereby determine the set of the variational start addresses.

Specifically, in the machine readable medium, the step of scanning comprises provisionally reading the original waveform sample while incrementing addresses of the digital values of the original waveform sample to generate a musical tone, detecting a timing when one of the controls is operated during generation of the musical tone, and capturing an instant address coincident with the detected timing to determine the variational start address to be allotted to the operated control.

BRIEF DESCRIPTION OF THE DRAWINGS

These and other objects of the invention will be seen by reference to the description, taken in connection with the accompanying drawings, in which:

FIG. 6A and FIGS. 6B1 through 6B4 are diagrams illustrating data constitutions of the preferred embodiment of FIG. 1;

DETAILED DESCRIPTION OF PREFERRED EMBODIMENTS

Figure 1:
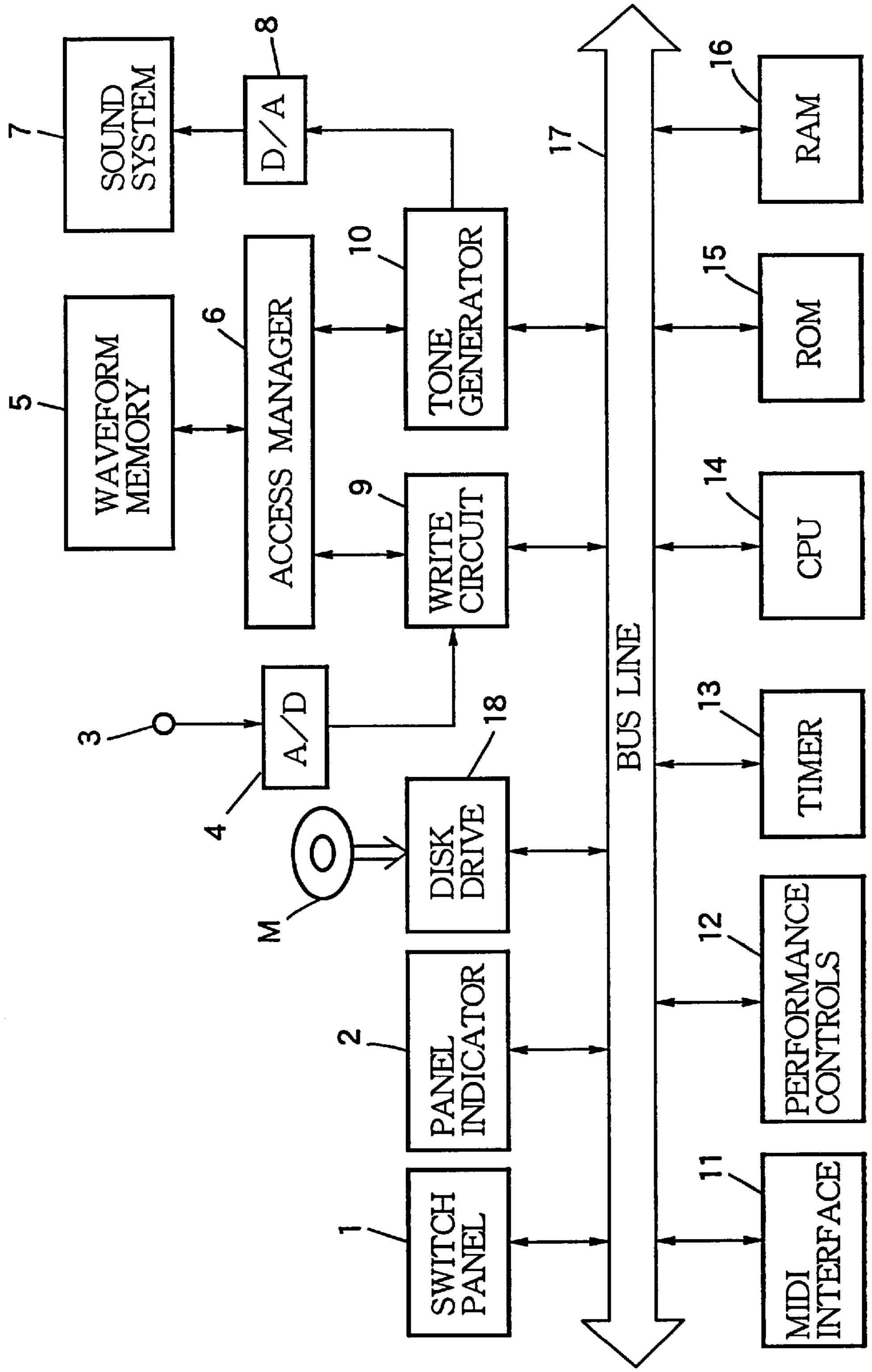
FIG. 1 is a block diagram illustrating an electronic musical instrument practiced as one preferred embodiment of the invention.

This invention will be described in further detail by way of example with reference to the accompanying drawings.

1. Constitution of the Preferred Embodiment

Now, referring to FIG. 1, a constitution of an electronic musical instrument practiced as one preferred embodiment of the invention will be described. In the figure, reference numeral 1 denotes a switch panel arranged with various controls to be operated by a user. Reference numeral 2 denotes a panel indicator providing various pieces of information to the user. External views of the switch panel 1 and the panel indicator 2 are illustrated in FIGS. 2A and 2B. In the figure, the switch panel 1 includes a mode switch 1*a*, a numeric key array 1*b*, an enter key 1*c*, an exit key 1*d*, an increment/YES key 1*e*, a decrement/NO key 1*f*, a cursor key group 1*g*, and a multipurpose key 1*h*.

Referring to FIG. 1 again, reference numeral 3 denotes an external waveform input terminal through which a tone signal is inputted from an external microphone for example. Reference numeral 4 denotes an analog-to-digital (A/D) converter for sampling the inputted tone signal into a digital signal. Reference numeral 5 denotes a waveform memory for storing the digital signal in the form of a waveform sample composed of a series of digital values. Reference numeral 6 denotes an access manager for executing memory access control such that read and write accesses to the waveform memory do not conflict with each other.

Reference numeral 9 denotes a write circuit for writing the digital signal supplied from the A/D converter 4 into the waveform memory 5 through the access manager 6. Reference numeral 10 denotes a tone generator that reads a waveform sample from the waveform memory 5 through the access manager 6, and imparts an envelope to the waveform sample to generate a tone signal. It should be noted that the tone generator 10 can simultaneously generate tone signals through a plurality of sound channels by time-division processing. Reference numeral 8 denotes a digital-to-analog (D/A) converter for converting the digital tone signal supplied from the tone generator 10 into an analog tone signal. Reference numeral 7 denotes a sound system that amplifies the analog tone signal supplied from the D/A converter 8 and sounds the amplified music tone.

Reference numeral 11 denotes a MIDI (Musical Instrument Digital Interface) for transferring MIDI signals with an external MIDI equipment. Reference numeral 12 denotes manual controls having a set of pads 12*a* through 12*h* to be operated by the user for music performance. Reference numeral 14 denotes a CPU (Central Processing Unit) that controls the various components of this electronic musical instrument through a bus line 17 as instructed by a control program stored in a ROM (Read Only Memory) 15. Reference numeral 16 denotes a RAM (Random Access Memory) for storing various pieces of data for use by the above-mentioned control program. Reference numeral 13 denotes a timer for causing a timer interrupt to the CPU 14 every predetermined time.

2. Data Structures of the Preferred Embodiment 2.1 Waveform Data

Figure 6A:
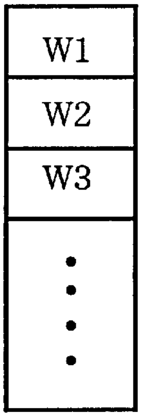
Figure 6A:
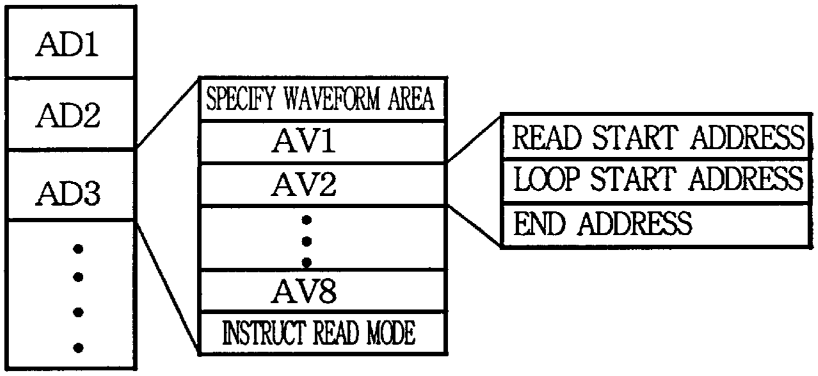
Figure 6A:
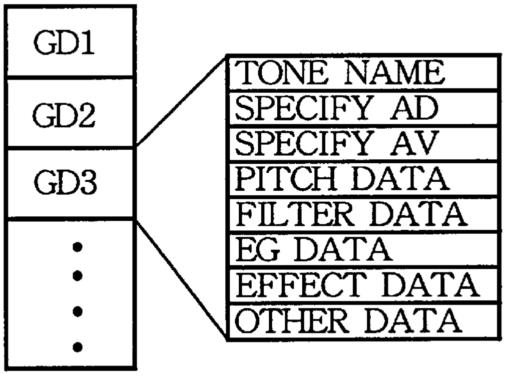
Figure 6A:
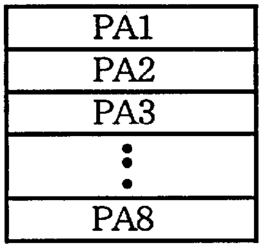
Figure 6A:
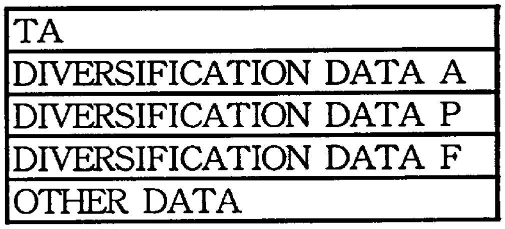

The following describes various data structures for use in the above-mentioned preferred embodiment with reference to FIGS. 6A and 6B1 through 6B4. FIG. 6A shows a plurality of waveform samples stored in the waveform memory 5. As shown, plural waveform samples W1, W2, and so on are stored in the waveform memory.

2.2 Address Data

Figure 2A:
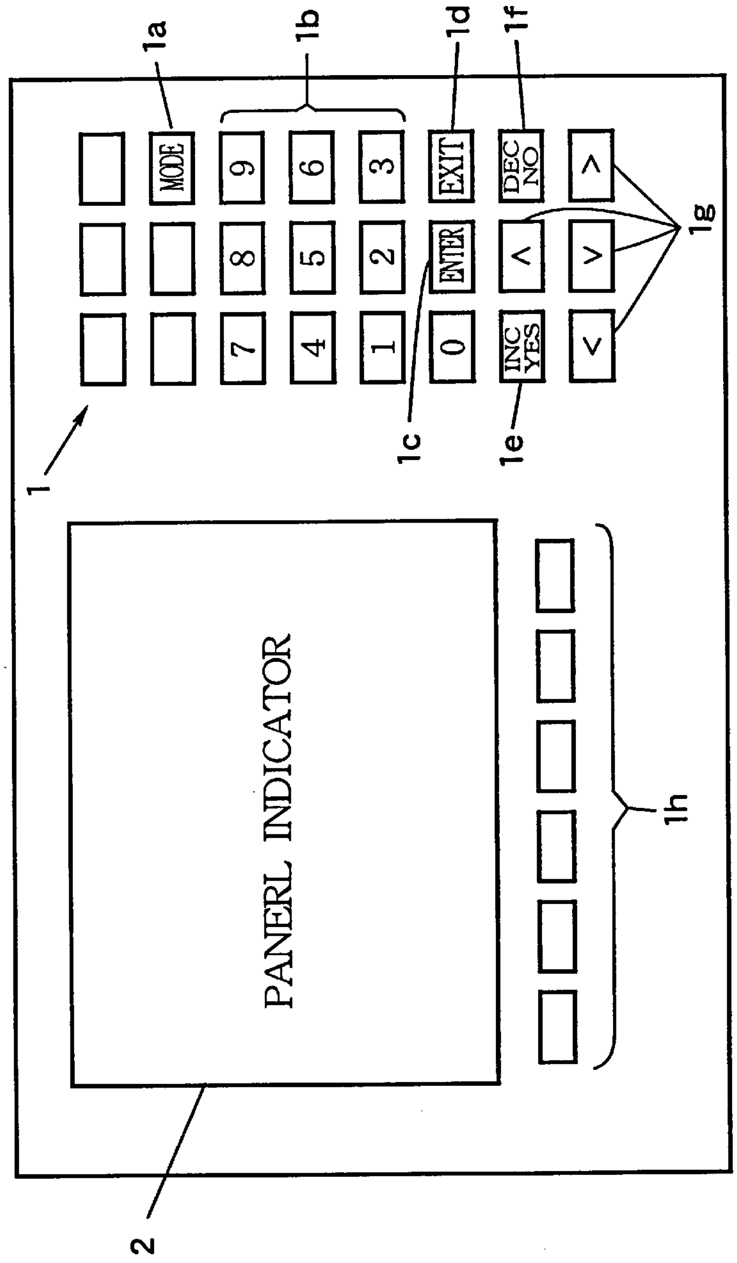
FIG. 2A and FIG. 2B illustrate a panel constitution of the preferred embodiment of FIG. 1.
Figure 2B:
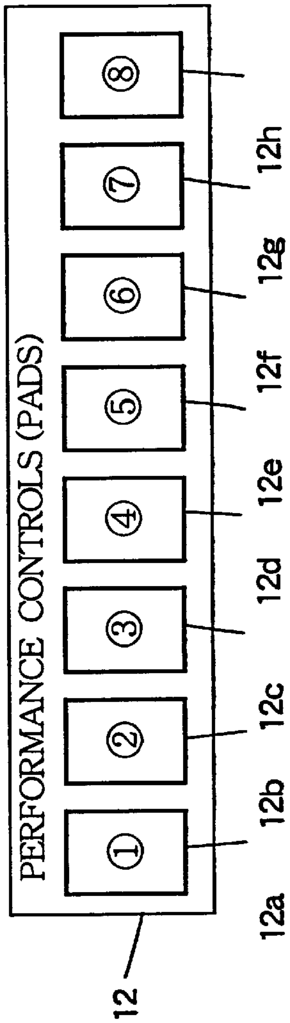
Figure 4:
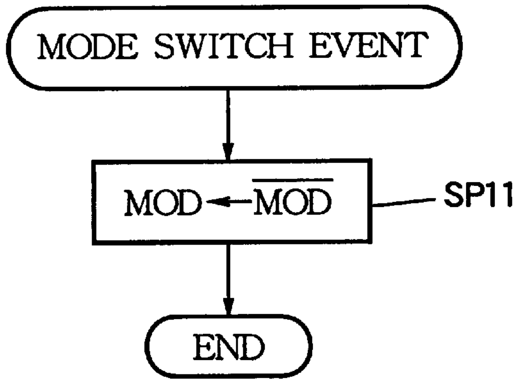
FIG. 4 is a flowchart indicative of a mode switch event processing subroutine.

The RAM 16 stores various pieces of data shown in FIGS. 6B1 through 6B4. Address data AD1, AD2, and so on shown in FIG. 6B1 correspond to the above-mentioned waveform sample W1, W2, and so on, in one-to-one relation. As shown, one piece of address data AD has waveform specification data, eight types of address variation data AV1 through AV8, and read mode indication data.

One piece of address variation data AV has a read start address, a loop start address, and an end address for the corresponding waveform sample. The waveform specification data specifies one of the waveform samples W1, W2, and so on.

The read start address denotes a start address from which the waveform sample is read. The loop start address denotes a start address at which a loop for repeatedly reading the waveform sample begins. The end address denotes an address at which the reading of the waveform sample or the loop reading thereof ends. The read mode indication data indicates whether the waveform sample is to be read in a loop manner or a reverse manner (namely reading a waveform sample reversibly from the end to the top).

2.3 Tone Control Data

The following describes a structure of tone control data GD1, GD2, and so on with reference to FIG. 6B2. One piece of tone control data GD includes tone name data, AD specification data, AV specification data, pitch data, filter data, EG data, effect data, and other data. The tone name data is character data such as "cymbal 1" and "cymbal 2". The AD specification data specifies one of the above-mentioned address data AD1, AD2, and so on. The AV specification data specifies one of the variation data AV1 through AV8 included in the specified address data AD. The pitch data specifies a read rate of the waveform sample W1, W2, and so on. The filter data specifies the details of filtering to be executed on the read waveform sample. In the above-mentioned embodiment, a pair of parameters for controlling the cutoff frequency and for controlling resonance of filtering are stored as filter data. The EG data specifies an envelope to be applied to a filtered tone signal. The effect data specifies an effect such as reverberation to be applied to the tone signal provided with the envelope.

2.4 Assignment Table

Figure 3:
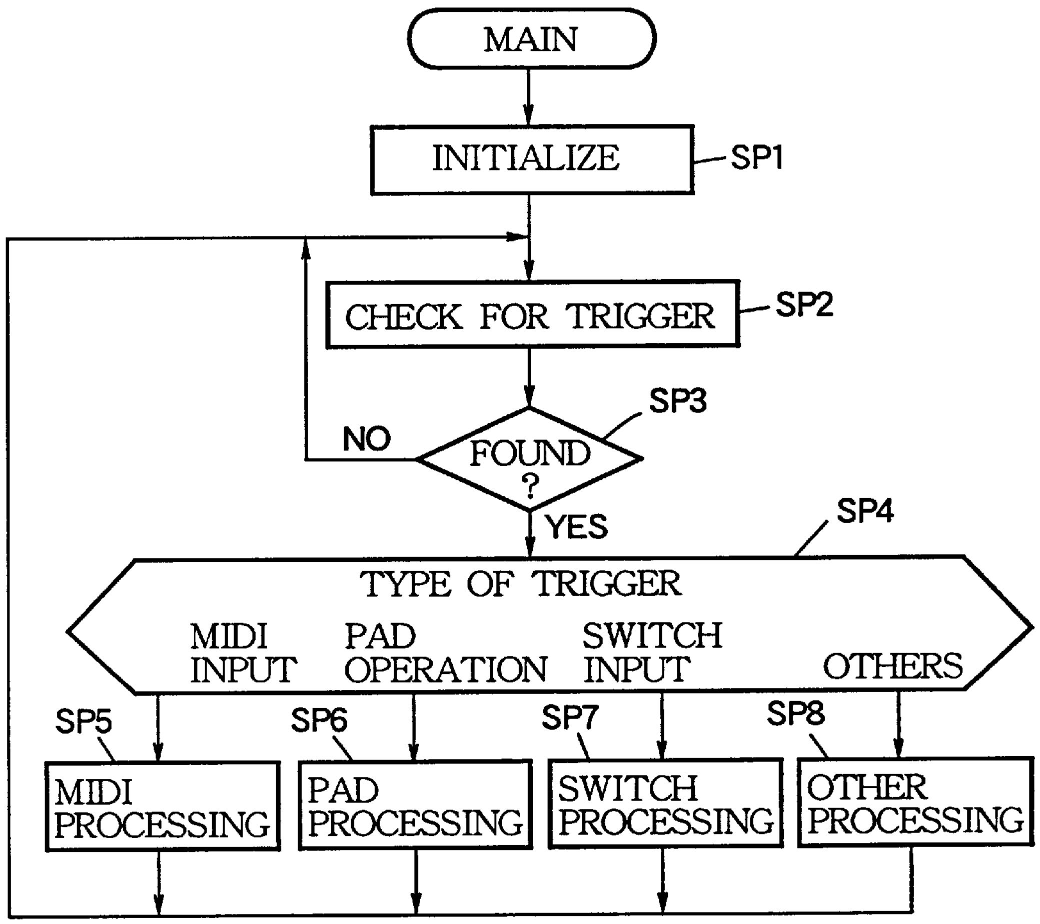
FIG. 3 is a flowchart indicative of a main routine of the preferred embodiment of FIG. 1.

The above-mentioned embodiment has two operation modes. One is the individual assignment mode, in which the pads 12*a* through 12*h* are assigned with different pieces of tone control data GD1, GD2, and so on. FIG. 6B3 shows an assignment table indicative of the assignment state, in which eight pieces of assignment data PA1 through PA8 are stored in correspondence with the number of pads 12*a* through 12*h*. Each assignment data PA specifies one of the tone control data GD1, GD2, and so on, thereby linking the tone control data GD1, GD2, and so on to the pads 12*a* through 12*h*.

2.5 Diversification Data Set

The other operation mode is the diversification mode, in which the common tone control data is assigned to each of the pads 12*a* through 12*h*. However, one or more of diversification processing operations including address diversification, pitch diversification, and filter diversification is executed on each of the pads 12*a* through 12*h*. These diversification processing operations generate different variations of the tone signal for the pads 12*a* through 12*h*.

In the address diversification, address variation data AV1 through AV8 are assigned to the pads. In the pitch diversification, a different pitch data is assigned to each of the pads. Namely, a predetermined pitch is assigned to the first pad 12*a* and pitches going higher in increment of a semitone scale are assigned to the subsequent pads 12*b* through 12*h*.

In the filter diversification, a different filter characteristic is associated to each of the pads. In the above-mentioned embodiment, eight pieces of filter data each composed of a pair of typical parameter values of the cutoff frequency and the resonance, namely (low, small), (low, large), (medium, small), (medium, medium), (medium, large), (high, small), (high, medium), and (high large), are assigned sequentially to the pads 12*a* through 12*h*.

FIG. 6B4 shows a diversification data set for specifying a diversification state in the diversification mode. As shown, assignment data TA specifies one of the above-mentioned tone control data GD1, GD2, and so on. Diversification data A is a binary variable for specifying whether the address diversification is to be executed or not. Diversification data P is a binary variable for specifying whether the pitch diversification is to be executed or not. Diversification data F is a binary variable for specifying whether the filter diversification is to be executed or not.

According to the invention, the electronic musical instrument is constructed in the form of a tone generator apparatus having the waveform memory 5. The waveform memory 5 has addresses for storing the plurality of waveform samples W1, W2, and so on. Each waveform sample is comprised of a series of digital values located sequentially along the addresses. Waveform selecting means is formed by means of the CPU 14 for selecting the waveform samples stored in the waveform memory 5. An address memory is formed in the RAM 16 for storing a set of start addresses AV1 through AV8 in correspondence to each waveform sample, The start addresses specify different addresses from which the same waveform sample is to be variably read out. Address designating means is implemented by means of the CPU 14 for designating a default start address among the set of the start addresses AV1 through AV8 to read out the waveform sample from the default start address. The set of controls 12 is manually operable to command generation of a musical tone. Diversifying means is implemented by means of the CPU 14 for commanding whether or not to undergo diversification of the start address of the waveform sample. Reading means is provided in the form of the tone generator 10 operative when the diversification is not commanded for reading each waveform sample from the default address in response to operation of a corresponding control, and operative when the diversification is commanded for reading the selected waveform sample from one start address selected from the set of the start addresses AV1 through AV8 in correspondence to the operated control. Synthesizing means is also composed of the tone generator 10 for synthesizing the musical tone according to the read waveform sample.

Preferably, the inventive tone generator apparatus further includes the filter memory provided in the RAM 16 for storing a default filter parameter in correspondence to each waveform sample, and for storing a set of variational filter parameters. The diversification means includes means for commanding whether or not to undergo diversification of the filtering process. The synthesizing means operates when the diversification of the filtering process is not commanded for undergoing the filtering process of the read waveform sample based on the default filter parameter, and operates when the diversification of the filtering process is commanded for applying the filtering process to the read waveform sample by using one of the variational filter parameters selected in correspondence to the operated one of the controls.

3. Operations of the Preferred Embodiment 3.1 Overall Operation

When the electronic musical instrument practiced as the preferred embodiment of the invention is powered on, a program shown in FIG. 3 starts. First, step SP1 initializes the. electronic musical instrument in a predetermined manner. Step SP2 checks for a trigger (such as a performance event inputted by the manual controls 12). Step SP3 determines whether a trigger has been found or not. If a trigger is found, then, step SP4 determines the process corresponding to the type of the detected trigger.

To be more specific, if a MIDI signal has been inputted through the MIDI interface 11, control is passed to step SP5. If a performance event of the manual controls 12 has been detected, control is passed to step SP6. If an event in the switch panel 1 has been detected, control is passed to step SP7. If other triggers have been detected, control is passed to step SP8. When the process corresponding to the detected trigger has ended in these steps, control is passed back to step SP2. The following describes in detail the process to be executed in correspondence to each of the above-mentioned triggers.

3.2 Mode Switch Event

When an event of the mode switch 1*a* has been detected, a mode switch event processing subroutine shown in FIG. 4 is called. In step SP11, the value ("1" or "0") of a mode flag MOD is inverted. The mode flag MOD indicates an operation mode, value "0" denoting the individual assignment mode and value "1" denoting the diversification mode.

3.3 Pad Assignment Processing

Figure 11:
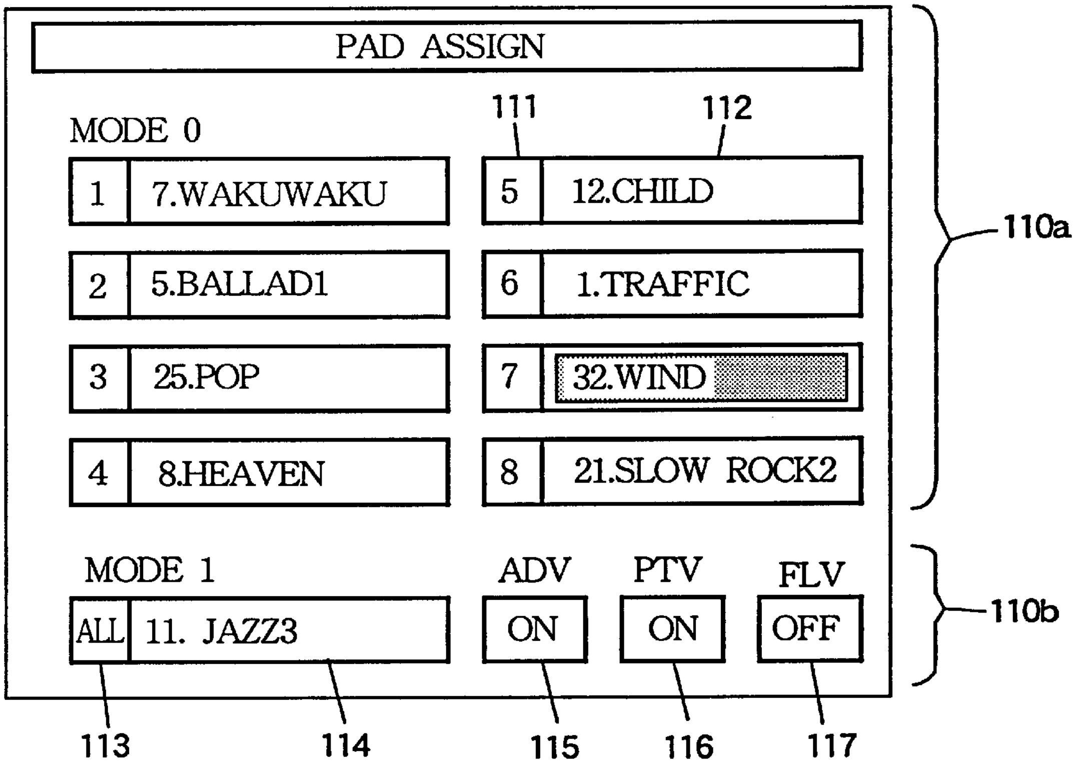
FIG. 11 is a diagram illustrating a pad assignment screen in a panel indicator of the preferred embodiment of FIG. 1.

When the user executes a predetermined operation, a pad assignment screen is displayed on the panel indicator 2 shown in FIG. 11. In the figure, reference numeral 110*a* denotes an individual assignment mode display block for indicating the assignment state when the individual assignment mode is "0". This block has eight boxes corresponding to the pads 12*a* through 12*h*. A number display block 111 at the left end of each box displays a number 1 to 8 for identifying each of the pads 12*a* through 12*h*. To the right of the number display block 111, a tone number (a serial number of one of the tone control data GD1, GD2, and so on corresponding to the assignment data PA1 through PA8) and a tone name (the content of the tone name data in the corresponding tone control data GD) are displayed.

Reference numeral 110*b* denotes a diversification mode display block indicative of the assignment state when the diversification mode is set to "1". Reference numeral 113 in the diversification mode display block 110*b* denotes a number display block. Mark "ALL" is displayed in the number display block because the same tone control data is assigned to all pads. A tone name display block 114 shows a tone name associated with the tone control data GD concerned.

Reference numeral 115 denotes an address diversification on/off display block. When the diversification data A is "1", mark "ON" is displayed. When the diversification data A is "0", mark "OFF" is displayed. A pitch diversification on/off display block 116 displays "ON" or "OFF" depending on the value of the diversification data P. A filter diversification on/off display block 117 displays "ON" or "OFF" depending on the value of the diversification data F.

Referring to FIG. 11, a hatched area denotes an input cursor. Operating the cursor key 1*g*, the user can move the input cursor horizontally or vertically, updating from time to time the data pointed by the cursor. To be more specific, in the address diversification on/off display block 115, the pitch diversification on/off display block 116, and the filter diversification on/off display block 117, mark "ON" is set when the increment/YES key is pressed, or mark "OFF" is set when the decrement/NO key 1*f* is set. The setting result is reflected on the data in the RAM 16 and is displayed on the screen.

In the tone name display blocks 112 and 114, when the increment/YES key 1*e* or the decrement/NO key 1*f* is pressed, the tone number in that position is incremented or decremented. Consequently, the corresponding assignment data PA or TA is updated. At the same time, the corresponding tone name is displayed based on one of the tone control data GD1, GD2, and so on specified by the updated assignment data PA or TA.

When a tone number is inputted through the numeric key matrix 1*b* and then the enter key 1*c* is operated, the content of the assignment data PA or TA is updated according to the inputted tone number. The updated tone number and the corresponding tone name are displayed in the tone name display blocks 112 and 114 pointed by the cursor. It should be noted that display data might be edited by various screens to be described later. When the data has been edited as required, pressing the exit key 1*d* returns control to the main routine.

3.4 Pad Control On-event

When an event of one of the pads 12*a* through 12*h* is detected in the main routine, control is passed to step SP6. Step SP6 determines whether the detected event is an on-event or an off-event. If the detected event is found an on-event, the pad control on-event subroutine shown in FIG. 5 starts.

Figure 5:
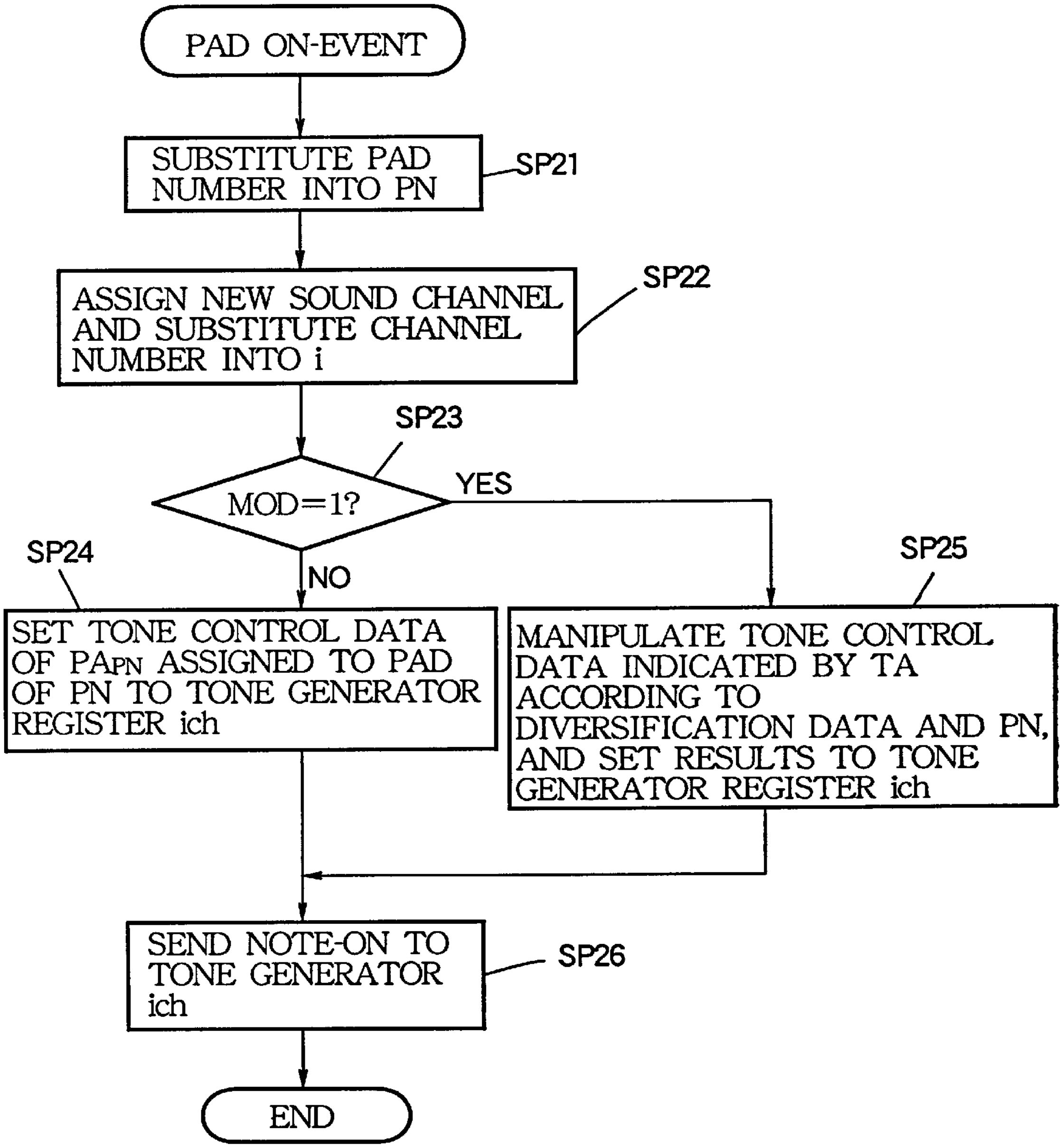
FIG. 5 is a flowchart indicative of a pad on-event processing subroutine.

Referring to FIG. 5, the pad number is substituted into a variable PN (pad number) in step SP21. Next, in step SP22, a new sound channel in the tone generator 10 is assigned and the number of the assigned channel is substituted into variable i. Then, step SP23 determines whether the mode flag MOD is the diversification mode "1" or not.

If the decision is YES, control is passed to step SP25. In the diversification mode, one piece of tone control data GD indicated by the assignment data TA is assigned to all pads. One piece of tone control data GD is manipulated according to various items of the diversification data set and according to the pad number PN as follows.

First, if the diversification data A is found "1", the address variation data AV corresponding to the pad number PN is selected from the eight pieces of address variation data AV contained in the address data AD indicated by the AD specification data of the tone control data GD. If the diversification data A is found "0", a default address variation data AV specified by the AV specification data of the tone control data GD is selected from the eight pieces of address variation data of the address data AD.

Next, if the diversification data P in the diversification data set is found "1", the pitch data corresponding to the pad number PN is selected from the above-mentioned semitone scale. If the diversification data P is found "0", the pith data set in the assigned tone control data GD is selected. Then, if the diversification data F is found "1", the filter data corresponding to the pad number PN is selected from the eight pieces of filter data composed of the above-mentioned typical parameter values. If the diversification data F is found "0", the filter data set in the assigned tone control data GD is selected.

The contents of the address variation data AV (namely, read start address, loop start address, and end address), the pitch data, and the filter data thus selected are set to a free channel (channel number i) of the tone generator 10 along with other data in the assigned tone control data GD. Then, in step SP26, a note-on signal associated with channel number i is supplied to the tone generator 10. When these processing operations come to an end, control is returned to the main routine.

On the other hand, in each sound channel of the tone generator 10, the waveform memory 5 is read at the rate specified by the pitch data along the address range specified by the address variation data AV. The read waveform sample is filtered based on the filter data. Then, a temporal variation in volume is imparted to the filtered data by a volume envelope based on EG data. The waveform sample thus shaped by each sound channel is imparted with an effect based on effect data, and mixed to the waveform samples of other sound channels. The mixed waveform samples are then converted by the D/A converter 8 into an analog signal to be sounded through the sound system 7.

If the mode flag MOD is "0", the decision is "NO" in step SP23, upon which control is passed to step SP24. In step SP24, a new sound channel (channel number i) in the tone generator 10 is assigned. The assignment data PA corresponding to the pad number PN is read from the eight pieces of assignment data PA stored in the assignment table. Channel number i of the tone generator 10 is set based on the tone control data GD specified by this assignment data PA.

Namely, the address data AD is determined by the AD specification data in the tone control data GD (consequently, waveform sample W is determined). Based on the AV specification data, default one of the eight address variation data AV1 through AV8 in the address data AD is selected. Then, the read rate of the waveform memory 5 and the parameters used by the filtering process in the tone generator 10 are determined based on the pitch data and filter data contained in the tone control data GD. The subsequent processing is the same as that executed when the mode flag MOD is diversification mode "1".

3.5 Pad Control Off-event

When an event of any of the pads 12*a* through 12*h* is detected in the main routine, control is passed to step SP6 as described above. If the detected event is found an off-event, a note-off signal associated with the channel number corresponding to the pad of that off-event is supplied to the tone generator 10. When this processing comes to an end, control is returned to step SP2 of the main routine. On the other hand, in the tone generator 10, after receiving the note-off signal, the volume envelope of that channel shifts to a release state, thereby releasing the channel after the volume has damped sufficiently.

3.6 MIDI Processing

If the input of a MIDI signal is detected in the MIDI interface 11, control is passed to step SP5, in which sounding process for this MIDI signal is executed. Namely, a MIDI key-on signal is handled in the same manner as the on-event of the manual pad in the individual assignment mode, and the MIDI key-off signal is handled in the same manner as the off-event of the manual pad. Therefore, a tone signal similar to that generated by the pad operation is generated based on an externally supplied MIDI signal.

The inventive electronic music instrument or music apparatus is comprised of a set of the controls 12 manually operable to input a performance event, the waveform memory 5 storing an original waveform sample W composed of a series of digital values sequentially readable from a default start address, and the processor or CPU 14 for executing the tone generating process in response to the performance event. The tone generating process is executed sequentially by the steps of scanning the original waveform sample to determine the set of variational start addresses AV1 through AV8 which are diverging from the default start address and which are allotted to corresponding ones of the controls 12, detecting an operated control among the plurality of the controls 12*a* to 12*h*, specifying one of the variational start addresses AV1 through AV8 corresponding to the operated control upon detection thereof, reading the original waveform sample W from the specified variational start address to provide a variational waveform sample which is diversified from the original waveform sample uniquely to the specified variational start address, and synthesizing a musical tone unique to the operated control in accordance with the provided variational waveform sample and in response to the performance event.

Practically, the waveform memory 5 stores the plurality of original waveform samples W1 to W8 which represent different timbres of the music tone. The tone generating process further includes the step of selecting one of the original waveform samples W1 to W8 subjected to the scanning when diversification of the original waveform sample is requested. The waveform memory 5 stores the plurality of the original waveform samples W1 to W8 which are allotted to corresponding ones 12*a* to 12*h* of the controls 12. The tone generating process further includes the step of reading one original waveform sample as it is from the default start address in correspondence to the operated control when the diversification of the original waveform sample in not requested. Practically, the music apparatus has the filter memory for storing a set of variational filter parameters which are allotted to corresponding ones of the controls and which are selectively usable for filtering of waveform samples. The step of synthesizing includes filtering the provided variational waveform sample by using one of the variational filter parameters selected from the filter memory in correspondence to the operated control to thereby modify the music tone.

3.7 Address Data Editing Processing

When the user operates the switch panel 1, control is passed to step SP7 of the main routine, in which a program corresponding to the operation starts. The user can issue an instruction for address data editing by executing a predetermined operation. When such an instruction is inputted, an address data editing screen shown in FIG. 12 is displayed on the panel indicator 2.

Figure 12:
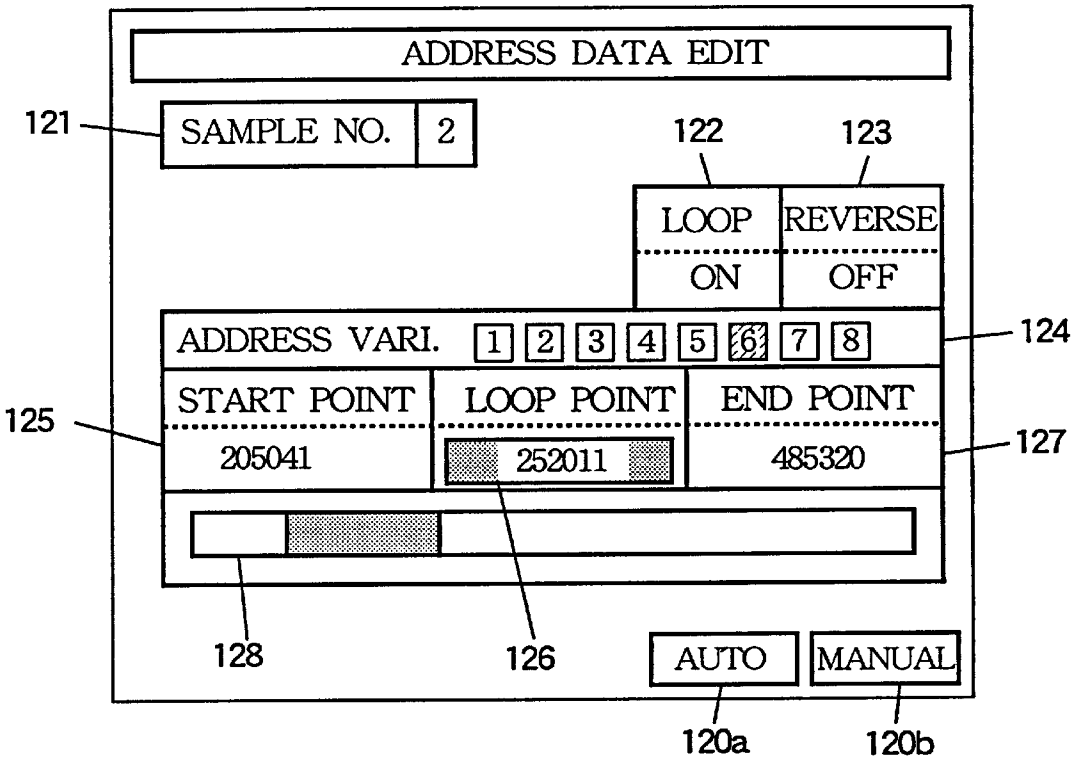
FIG. 12 is a diagram illustrating an address data editing screen in the above-mentioned panel indicator.

In FIG. 12, reference numeral 121 denotes a waveform sample identification block, in which a waveform sample number (one of the serial numbers of waveform sample W1, W2, and so on and equivalent to one of the serial numbers of address data AD1, AD2, and so on) is displayed. Reference numeral 122 denotes a loop on/off display block for displaying whether loop reading is to be executed or not. Reference numeral 123 denotes a reverse on/off display block for displaying whether reverse reading is to be executed or not. The contents of these display blocks 122 and 123 are determined by the read mode indication data of the address data AD corresponding to the waveform sample number indicated in the waveform sample identification block 121.

Reference numeral 124 denotes an address variation display block for specifying which of the eight pieces of address variation data AV1, through AV8 in the address data AD is selected. Reference numeral 125 denotes a read start address display block for displaying the read start address associated with the selected address variation data AV. Reference numeral 126 denotes a loop start address display block for displaying the loop start address associated with the selected address variation data AV. Reference numeral 127 denotes an end address display block for displaying the end address associated with the selected address variation data AV.

Reference numeral 128 denotes an address location display block for displaying a portion from the read start address to the end address along the address range of the selected waveform sample. In the screen shown in FIG. 12, the input cursor is positioned to the loop start address display block 126. Like the situation shown in FIG. 11, the user can designate, by operating the cursor key 1*g*, the loop on/off display block 122, the read start address display block 125, the loop start address display block 126, or the end address display block 127. By operating the numeric key matrix 1*b* and the increment/YES key 1*e* for example, the user can edit the data corresponding to the address data AD indicated by the waveform number in the waveform sample identification block 121.

When any of the pads is operated, the address variation data AV corresponding to the pad number PN of the operated pad is selected. The number of the selected address variation data is displayed in the address variation display block 124. The contents of the read start address display block 125, the loop start address display block 126, and the end address display block 127 are updated to those specified by the selected address variation data AV. At the same time, the tone generation process based on the selected address variation data AV may be executed in the tone generator 10.

Reference numeral 120*a* denotes an auto switch identification block. Reference numeral 120*b* denotes a manual switch identification block. These identification blocks display that the multipurpose keys 1*h* located in the proximity of these blocks function as an automatic switch and a manual switch, respectively. When the user presses the automatic switch or the manual switch, corresponding process is executed for scanning the waveform to determine variational start addresdses.

3.8 Auto Switch On-event Processing

Figure 7:
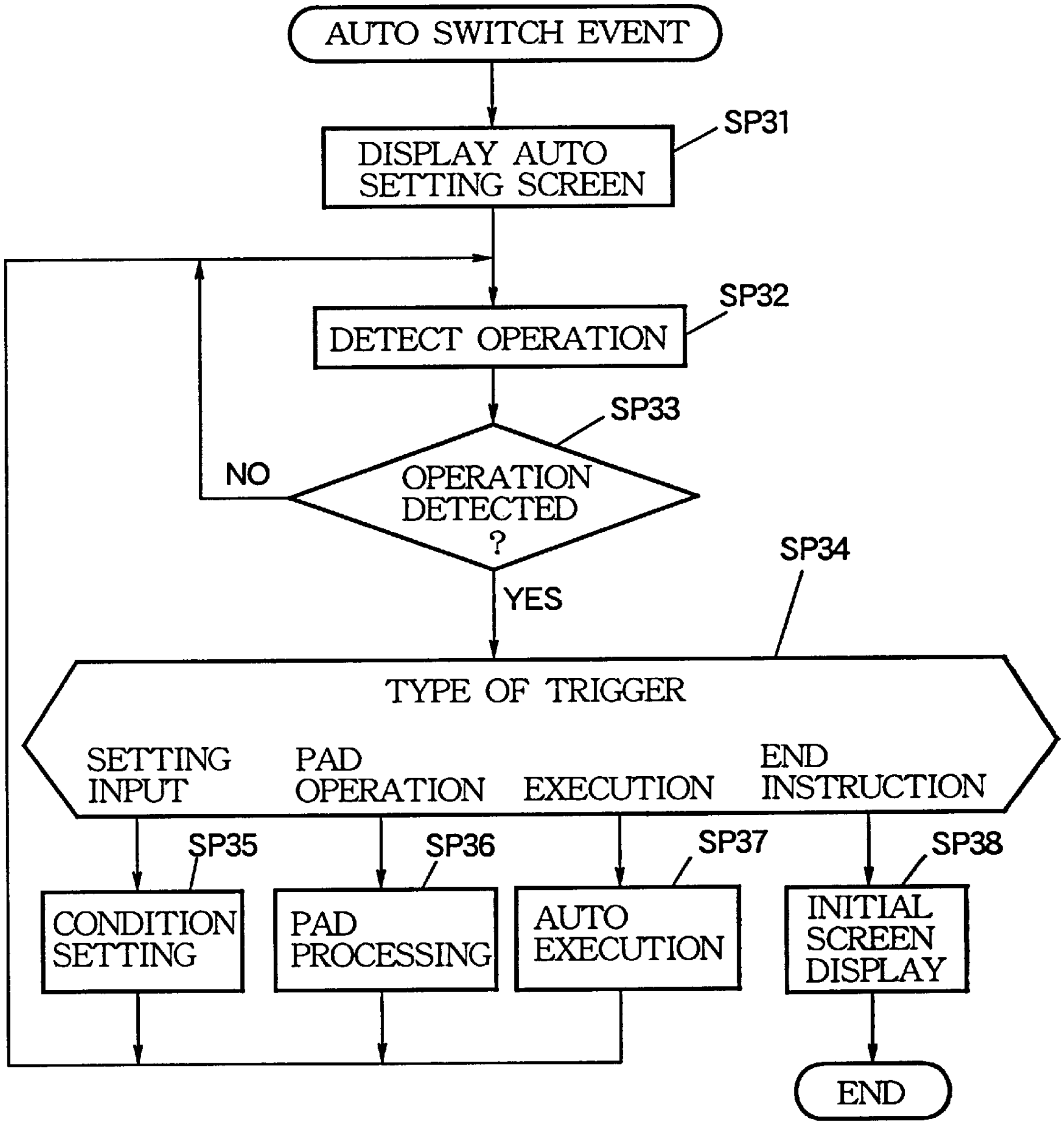
FIG. 7 is a flowchart indicative of an auto switch event processing subroutine.

When the user turns on the auto switch on the address data editing screen shown in FIG. 12, the auto switch event processing shown in FIG. 7 is executed. In FIG. 7, when control is passed to step SP31, an auto setting screen shown in FIG. 13 is displayed.

Figure 13:
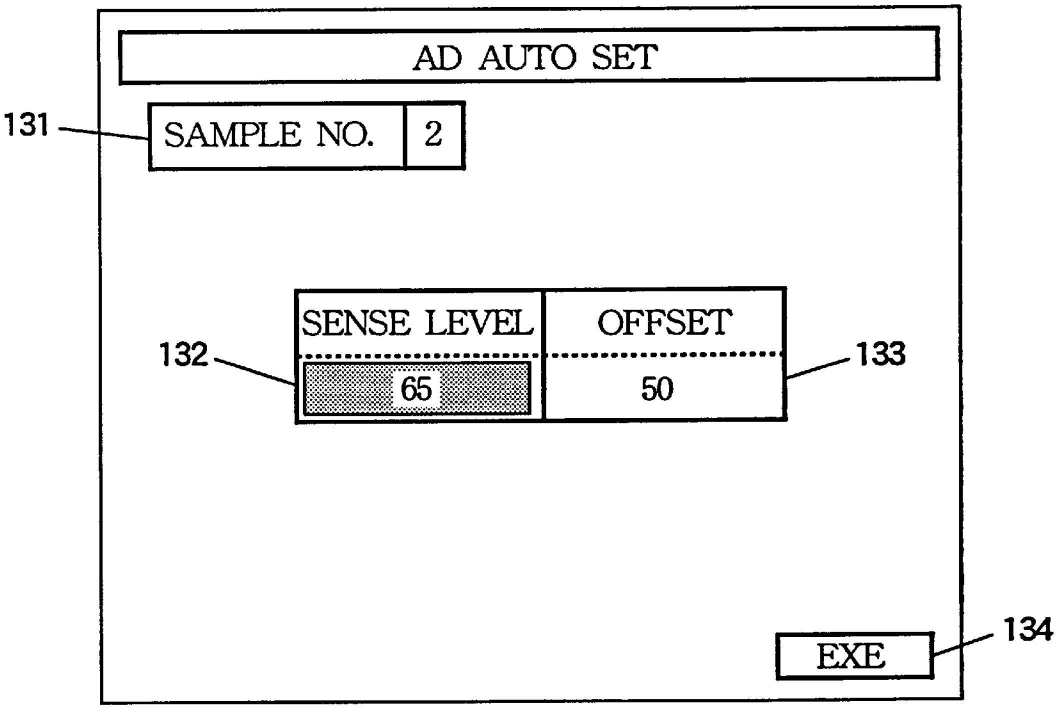
FIG. 13 is a diagram illustrating an auto setting screen in the above-mentioned panel indicator.

Referring to FIG. 13, reference numeral 131 denotes a waveform sample identification block, in which a selected waveform sample number is displayed like the above-mentioned waveform sample identification block 121. Reference numeral 132 denotes a rising threshold display block for displaying a threshold SENSE_LEVEL for determination of the rising edge of waveform sample. Reference numeral 133 denotes an offset display block for displaying an offset value OFFSET used for setting the read start address with respect to the rising point at which the waveform sample level exceeds the threshold SENSE_LEVEL. Reference numeral 134 denotes an execution switch identification block for displaying that the multipurpose key 1*h* located in the proximity is assigned to the execution switch.

Referring to FIG. 7 again, in steps SP32 and SP33, the processing is kept in the standby state until the user executes an operation. Then, when an operation executed by the user is detected, control is passed to step SP34, in which processing corresponding to the detected operation is determined. The following describes in detail each processing determined in step SP34.

3.8.1 Setting Input

If an event of the switch panel 1 is detected in step SP32, control is passed through step SP33 and step SP34 to step SP35, in which the processing corresponding to the key that causes the detected event is executed. To be more specific, if an event of the cursor key 1*g* is detected, the input cursor is moved to the waveform dada identification block 131, the rising threshold display block 132, or the offset display block 133.

If the numeric key array 1*b* is operated, a corresponding value is set directly at the current cursor position. If the increment/YES key 1*e* or the decrement/NO key 1*f* is operated, the value at the current cursor position is incremented or decremented, respectively. Namely, in the above-mentioned embodiment, the threshold SENSE_LEVEL and the offset value OFFSET can be set.

3.8.2 Pad Operation

If an event of any of the pads 12*a* through 12*h* is detected, control is passed to step SP36. In this step, the processing generally similar to that described in step SP6 is executed on the on-event and off-event of the pad. However, the processing of step SP36 is different from that of step SP6 in that the mode flag MOD is regarded as diversification mode “1”, the diversification data A is regarded as “1”, and the diversification data P and the diversification data F are regarded as “0”. This difference is to allow the user to make distinction between the waveform differences corresponding to the pads 12*a* through 12*h*.

3.8.3 Execution Instruction

Figure 8:
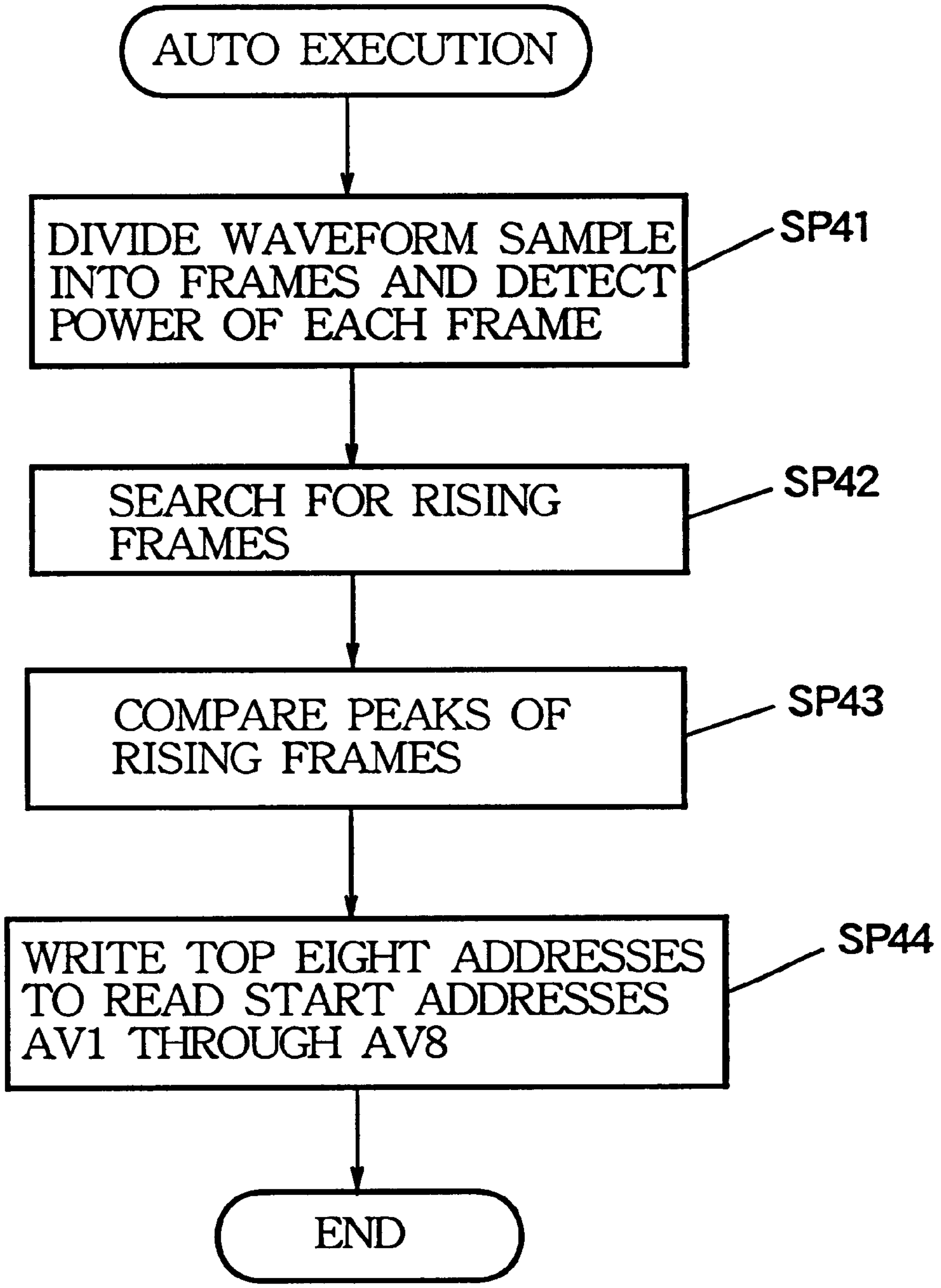
FIG. 8 is a flowchart indicative of an auto execution subroutine.

If an event of the execution switch is detected, control is passed to step SP37. In this step, the auto execution subroutine shown in FIG. 8 is called. In FIG. 8, when control is passed to step SP41, the selected waveform sample composed of a series of digital values is divided into segments of a predetermined length (hereinafter, referred to as “frame”) and the power of each frame is computed. Next, when control is passed to step SP42, the selected waveform sample is scanned for detecting rising frames.

In the above-mentioned embodiment, a point at which a waveform sample value has risen over the threshold SENSE_LEVEL is called a rising point. As a rule, a frame including this rising point is called a rising frame. Likewise, a point at which a waveform sample value has fallen below a threshold RELEASE_LEVEL is called a falling point. As a rule, a frame including this falling point is called a falling frame.

It should be noted that the number of frames from a rising frame to a subsequent falling frame inclusive must exceed a predetermined value (for example, 3). This is the first condition. Unless the first condition is satisfied, both frames are regarded as neither a rising frame nor a falling frame. This determination is made for excluding a very short length of waveform sampling.

Further, the number of frames from a falling frame to a subsequent rising frame inclusive must exceed another predetermined value (for example, 2). This is the second condition. Unless the second condition is satisfied, both frames are regarded as neither a falling frame nor a rising frame. This is because, if two waveform segments with a very short interval exist, it is rational in audibility to regard both waveform segments as one waveform.

Figure 15:
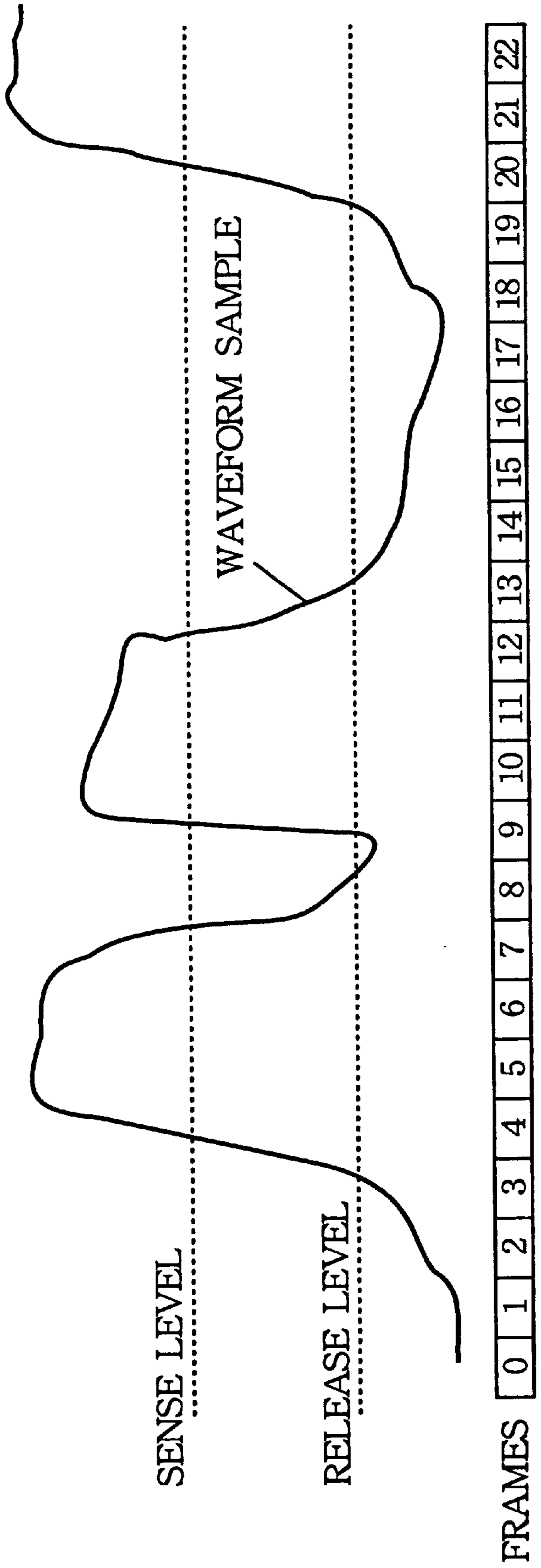
FIG. 15 is a waveform diagram illustrating an algorithm of the above-mentioned auto execution subroutine.

This will be described in detail by using an example with reference to FIG. 15. At frame number 4 in FIG. 15, the waveform sample level is rising over the threshold SENSE_LEVEL. At frame number 8, the waveform sample level is falling below the threshold RELEASE_LEVEL. Because the difference between these frame numbers is four, frame number 4 satisfies the above-mentioned first condition. In addition, because the rising point of frame number 4 is the first rising point, the above-mentioned secondd condition is not considered. Consequently, this frame number 4 represents a rising frame.

After falling to frame number 8, the waveform sample level rises again at frame number 9. Because the difference between these frame numbers is one, the above-mentioned first condition is not satisfied, these frame numbers are not a falling frame and a rising frame. Then, at frame number 13, the waveform sample level falls and, at frame number 20, the waveform sample level rises. The difference between frame number 4 and frame number 13 is nine, and the difference between frame number 13 and frame number 20 is seven. Therefore, frame number 13 satisfies the first and second conditions. Consequently, frame number 13 represents a falling frame.

Next, after rising at frame number 20, the waveform sample level does not fall at least at frame number 22, so that the difference with a frame including the next falling point is always three or higher. Therefore, frame number 20 satisfies both the first and second conditions, representing a rising frame. Thus, the example shown in FIG. 15 indicates that frame numbers 4 and 20 represent rising frames and frame number 13 represents a falling frame.

Subsequently, plural sections from the rising frame to the falling frame are determined by executing the scan processing similar to the above-described scan processing on the waveform sample. Then, referring to FIG. 8 again, the powers (or the peak values) of the rising frames are compared with each other in step SP43. In step SP44, for the sections having top eight powers, the offset value OFFSET is subtracted from each rising point (or the start address of the rising frame). The subtraction results are sequentially written to the start addresses of the address variation data AV1 through AV8. When the above-mentioned processing comes to an end, control is returned to the auto switch event shown in FIG. 7.

3.8.4 End Instruction

When an event of the exit key 1*d* is detected, control is passed to step SP38. In this step, the screen of the panel indicator 2 is returned to the screen displayed before the execution of the auto switch event processing (in this case, the address data editing screen shown in FIG. 12), upon which this subroutine comes to an end.

On the address data edit screen displayed again, the content of the read start address display block 125 is updated according to the contents of the updated address variation data AV1 through AV8. Thus, when the user presses the auto switch on the address data editing screen, the read start addresses in the address variation data AV1 through AV8 are automatically set according to the contents of the selected waveform sample. Therefore, the user can set the read start addresses through a very simple operation. Moreover, operating any of the pads 12*a* through 12*h*, the user can auditorily check the tone quality of a waveform that starts from the read start address.

The above-mentioned inventive method determines a set of start addresses used for variably reading one waveform sample. The inventive method is executed by the steps of storing the waveform sample in the waveform memory, detecting a plurality of rising points involved in the waveform sample, quantizing a segment or frame of the waveform sample around each rising point to evaluate a magnitude associated to each rising point, and sorting the detected rising points in terms of the magnitudes so as to select significant ones of the detected rising points to thereby determine the set of the start addresses.

3.9 Manual Switch Event Processing

Figure 9:
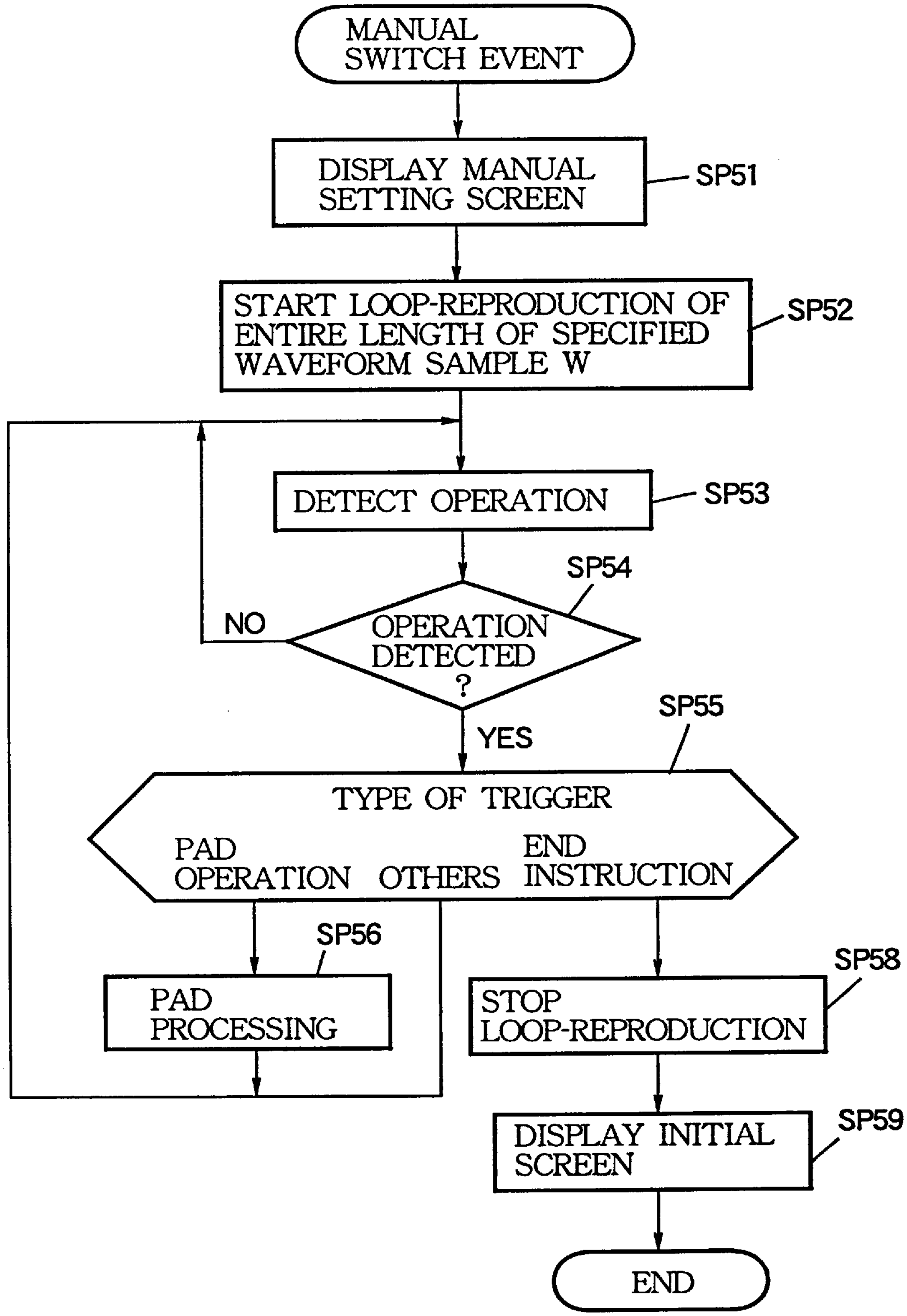
FIG. 9 is a flowchart indicative of a manual switch event processing.

When the user presses the manual switch on the address data editing screen shown in FIG. 12, the manual switch event processing shown in FIG. 9 starts. In step SP51 shown in FIG. 9, an address data manual setting screen shown in FIG. 14 is displayed.

Figure 14:
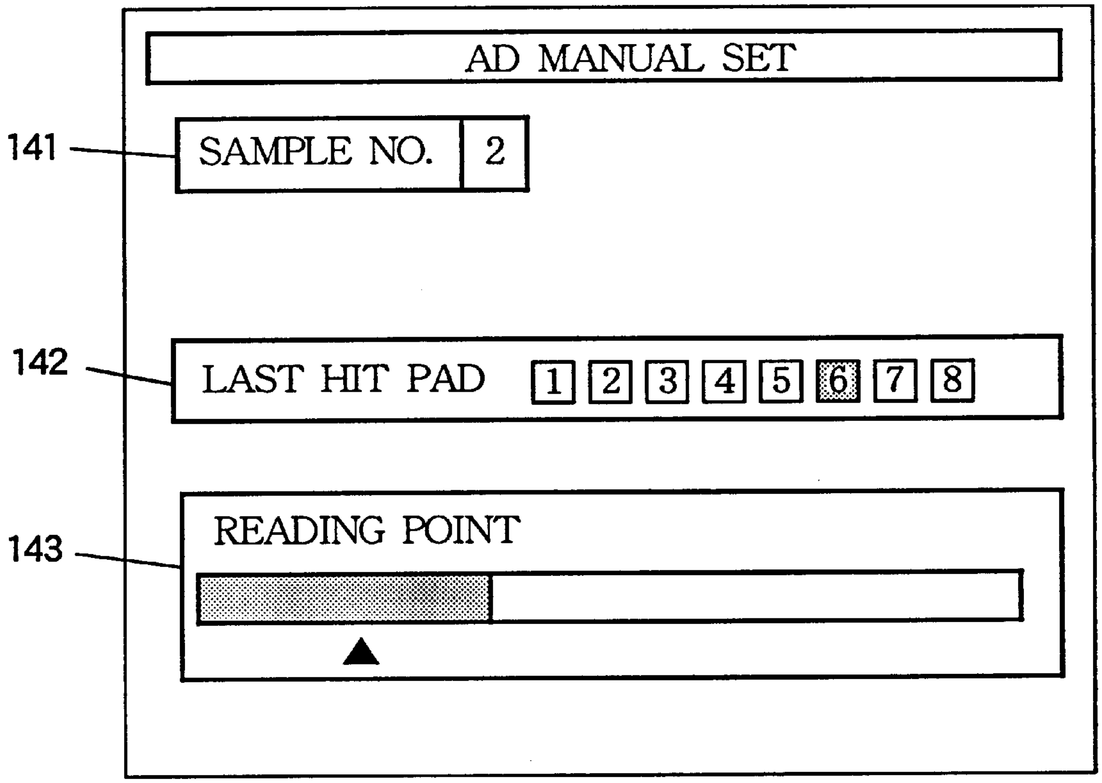
FIG. 14 is a diagram illustrating an address data manual setting screen in the above-mentioned panel indicator.

Referring to FIG. 14, reference numeral 141 denotes a waveform sample identification block, in which a waveform sample number is displayed like the above-mentioned waveform sample identification blocks 121 and 131. Reference numeral 142 denotes a last hit pad display block, in which a pad number PN of a pad hit last is displayed. Reference numeral 143 denotes a reading point display block, in which the current reading position in the selected waveform sample W is displayed.

Next, in step SP52, reproduction in loop of the entire length of the specified waveform sample W starts. At the same time, the position of the read address during the loop reproduction is displayed in a banner-like manner in the reading point block 143. Then, in steps SP53 and SP54, the processing is kept in a standby state until another operation is detected. When another operation is detected, control is passed to step SP55, in which the processing corresponding to the type of the trigger is selected.

3.9.1 Pad On-event

Figure 10:
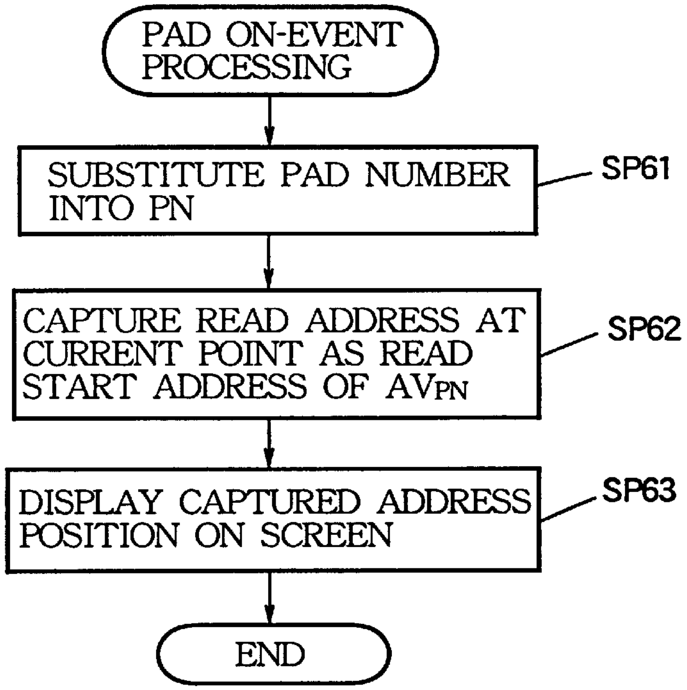
FIG. 10 is a flowchart indicative of another pad on-event processing subroutine.

When an on-event of any of the pads 12*a* through 12*h* is detected in step SP53, control is passed to step SP56. In this step, the pad on-event processing subroutine shown in FIG. 10 starts. Referring to FIG. 10, the number of the operated pad is substituted into a variable PN in step SP61. Next, in step SP62, the current or instant read address of the waveform sample W is captured as the read start address of the address variation data AV corresponding to the pad number PN.

Then, in step SP63, this captured read start address is indicated with a black arrow below the reading point display block 143. At the same time, the display of the last hit pad display block 142 is made by the pad number PN of the operated one of the pads 12*a* through 12*h*. When the above-mentioned processing comes to an end, control is returned to the routine shown in FIG. 9.

3.9.2 End Instruction

When an event of the exit key 1*d* on the switch panel 1 is detected, control is passed to step SP58. In this step, the loop reproduction of the waveform sample W is stopped. Next, in step SP59, the display of the panel indicator 2 is returned to the screen displayed before the execution of the manual switch event processing (in this case, the address data editing screen shown in FIG. 12), upon which this subroutine comes to an end.

Thus, when the user presses the manual switch, the loop reproduction is executed on the entire waveform sample W. Therefore, the user can easily set the read start address by operating the pad at a timing when a desired tone is outputted while listening to the loop-reproduced tone. The read start addresses set by the auto switch on-event and the manual switch event processing may be further modified in-the address data editing screen shown in FIG. 12 that is displayed again after execution of any of these processing operations.

The inventive method manually determines a set of start addresses used for variably reading one waveform sample in correspondence to a set of manual controls. The inventive method is carried out by the steps of storing the waveform sample in the waveform memory along a range of addresses, sequentially reading the waveform sample form the range of the addresses to generate a musical tone, operating one of manual controls during the generation of the music tone, and capturing an instant address from the range in coincident with a timing of operating the manual control to thereby determine the start address in association with the operated manual control.

4. Modifications

The present invention is not limited to the above-mentioned embodiment. For example, the following variations are possible.

4.1 In the above-mentioned embodiment, eight pieces of address variation data AV contained in one data set AD are provided in correspondence to each of waveform samples W. It will be apparent that, by linking plural address data sets AD to one piece of waveform sample W, the variation associated with that waveform sample W can be extended further. In this case, an arrangement may be made in which address data AD to be used for each piece of waveform sample W may be selected beforehand.

4.2 In the above-mentioned embodiment, the pitch diversification is executed by semitone scale. It will be apparent that the pitch diversification may also be executed by whole tone scale or natural scale.

4.3 In the above-mentioned embodiment, the filter diversification is executed by a set of eight filter characteristics. It will be apparent that plural sets of eight filter characteristics may be prepared. The filter diversification may be executed by one set selected from the plural sets of filter characteristics. Moreover, the eight characteristics to be developed may be edited individually.

4.4 In the above-mentioned embodiment, a point before a rising point by an offset value OFFSET is set to the read start address in the auto switch event processing shown in FIG. 9. It will be apparent that a zero-cross address before a rising point or a point at which the waveform sample level reaches a predetermined threshold S (S being for start address detection) immediately before the rising point may be set to the read start address.

4.5 In the above-mentioned embodiment, the eight read start addresses are set in the order of the higher powers of rising frames in the auto switch event processing shown in FIG. 9. It will be apparent that the read start address may be set by the eight read start addresses of the next higher powers according to the re-operation of the execution key after the setting of the eight read start addresses in the above-mentioned embodiment. Alternatively, eight read start addresses may be set from the beginning of the waveform sample in a time sequential manner. The value for use in comparison may be other than the power of a rising frame. For example, a sum of powers of all frames from the rising frame to the falling frame may be used. The power of each frame may be computed in terms of the effective power, mean level, peak level, or volume envelope of the waveform sample of each frame or any combination thereof.

4.6 In the above-mentioned embodiment, the cutoff frequency and resonance of a tone signal are controlled by filter data. It will be apparent that the cutoff frequency and resonance may also be controlled by other data known as tone filtering.

4.7 The above-mentioned embodiment is constituted by an electronic musical instrument. It will be apparent that the capabilities provided by the electronic musical instrument may be implemented by a general-purpose personal computer having a disk drive 18 (FIG. 1). In this case, the above-mentioned control program may be provided in any of various machine readable media M (FIG. 1) such as a CD-ROM, a magnetic disk, a magneto-optical disk, and a magnetic tape. The machine readable medium M is used in the music apparatus having the CPU 14, the set of controls 12 manually operable to input a performance event, and the waveform memory 5 storing an original waveform sample W composed of a series of digital values sequentially readable from a default start address. The medium M contains program instructions executable by the CPU 14 for causing the music apparatus to perform a tone generating process in response to the performance event by the steps of scanning the original waveform sample to determine a set of variational start addresses which are diverging from the default start address and which are allotted to corresponding ones of the controls 12, detecting an operated control among the plurality of the controls 12, specifying one of the variational start addresses corresponding to the operated control upon detection thereof, reading the original waveform sample from the specified variational start address to provide a variational waveform sample which is diversified from the original waveform sample uniquely to the specified variational start address, and synthesizing a musical tone unique to the operated control in accordance with the provided variational waveform sample and in response to the performance event.

Specifically, the step of scanning comprises locating a plurality of rising points involved in the series of the digital values of the original waveform sample, quantizing a segment of the digital values around each rising point to evaluate a magnitude associated to each rising point, sorting the located rising points in terms of the magnitudes so as to select significant ones of the rising points to thereby determine the set of the variational start addresses. Alternatively, the step of scanning comprises provisionally reading the original waveform sample while incrementing addresses of the digital values of the original waveform sample to generate a musical tone, detecting a timing when one of the controls is operated during generation of the musical tone, and capturing an instant address coincident with the detected timing to determine the variational start address to be allotted to the operated control.

As described and according to the invention, plural read start addresses can be set to one type of waveform sample. This novel constitution allows the user to generate various desired variations of a music tone on one type of waveform sample. In addition, the plural read start addresses can be set automatically or a simple manual operation.

While the preferred embodiments of the present invention have been described using specific terms, such description is for illustrative purposes only, and it is to be understood that changes and variations may be made without departing from the spirit or scope of the appended claims.

What is claimed is:

1. A method of preparing a set of start addresses in an address memory used for variably reading one waveform sample from a waveform memory, comprising the steps of:

storing a waveform sample in the waveform memory;

detecting a plurality of rising points involved in the waveform sample;

selecting a predetermined number of rising points from said plurality of the detected rising points in accordance with physical characteristics of each of said plurality of the detected rising points; and storing a predetermined number of start addresses corresponding to said predetermined number of the selected rising points into the address memory.

2. The method according to claim 1, wherein the step of detecting further comprises manually setting a threshold level such that the waveform sample is processed by the threshold level so as to detect the rising points.

3. The method according to claim 1, wherein the step of storing further comprises subtracting an offset value from each of the predetermined number of the selected rising points to determine each of the predetermined number of start addresses.

4. The method according to claim 3, wherein the step of storing further comprises manually setting the offset value.

5. The method according to claim 3, wherein the step of storing further comprises setting the offset value such that each start address coincides with each zero-crossing point immediately preceding to each rising point.

6. The method according to claim 1, wherein the step of storing further comprises storing each start address which coincides with each zero-crossing point immediately preceding to each rising point.

7. A method of generating a variational waveform based on an original waveform sample being composed of a series of digital values containing a plurality of rising points and being stored in a waveform memory, comprising the steps of:

storing a set of start addresses specifying different addresses corresponding to said rising points in an address memory;

selecting one start address from said set of the start addresses stored in the address memory; and reading the original waveform sample from the selected start address to provide the variational waveform based on said original waveform sample.

8. A method of generating a variational waveform based on an original waveform sample composed of a series of digital values stored in a waveform memory, comprising the steps of:

storing a plurality of address information such that each of said address information contains a start address, a loop start address, and an end address;

selecting one address information from said plurality of the address information; and reading the original waveform sample from the start address of the selected address information to the end address of the selected address information, and then repeatedly reading the original waveform sample from the loop start address of the selected address information to the end address of the selected address information to thereby provide the variational waveform based on said original waveform sample.

9. An apparatus for preparing a set of start addresses used for variably reading one waveform sample, comprising:

a waveform memory that stores the waveform sample;

a detecting section that detects a plurality of rising points involved in the waveform sample;

a selecting section that selects a predetermined number of rising points from said plurality of the detected rising points in accordance with physical characteristics of each of said plurality of the detected rising points; and an address memory that stores a predetermined number of start addresses corresponding to said predetermined number of the selected rising points.

10. An apparatus for generating a variational waveform based on an original waveform sample being composed of a series of digital values containing a plurality of rising points and being stored in a waveform memory, comprising:

an address memory that stores a set of start addresses specifying different addresses corresponding to said rising points;

a selecting section that selects one start address from said set of the start addresses stored in the address memory; and a reading section that reads the original waveform sample from the selected start address to provide the variational waveform based on said original waveform sample.

11. An apparatus for generating a variational waveform based on an original waveform sample composed of a series of digital values stored in a waveform memory, comprising:

an address memory that stores a plurality of address information such that each of said address information contains a start address, a loop start address, and an end address;

a selecting section that selects one address information from said plurality of the address information; and a reading section that reads the original waveform sample from the start address of the selected address information to the end address of the selected address information, and then repeatedly reads the original waveform sample from the loop start address of the selected address information to the end address of the selected address information to thereby provide the variational waveform based on said original waveform sample.

12. A machine readable medium for use in a music apparatus having a processor, a waveform memory and an address memory, the medium containing program instructions executable by the processor for causing the music apparatus to perform a process of preparing a set of start addresses in the address memory used for variably reading one waveform sample from the waveform memory, wherein the process comprises the steps of:

loading the waveform sample in the waveform memory;

detecting a plurality of rising points involved in the waveform sample;

selecting a predetermined number of rising points from said plurality of the detected rising points in accordance with physical characteristics of each of said plurality of the detected rising points; and storing a predetermined number of start addresses corresponding to said predetermined number of the selected rising points into the address memory.

13. A machine readable medium for use in a music apparatus having a processor, a waveform memory and an address memory, the medium containing program instructions executable by the processor for causing the music apparatus to perform a process of generating a variational waveform based on an original waveform sample being composed of a series of digital values containing a plurality of rising points and being stored in the waveform memory, wherein the process comprises the steps of:

preparing a set of start addresses specifying different addresses corresponding to said rising points in the address memory;

selecting one start address from said set of the start addresses stored in the address memory; and reading the original waveform sample from the selected start address to provide the variational waveform based on said original waveform sample.

14. A machine readable medium for use in a music apparatus having a processor and a waveform memory, the medium containing program instructions executable by the processor for causing the music apparatus to perform a process of generating a variational waveform based on an original waveform sample composed of a series of digital values stored in the waveform memory, wherein the process comprises the steps of:

preparing a plurality of address information such that each of said address information contains a start address, a loop start address, and an end address;

selecting one address information from said plurality of the address information; and reading the original waveform sample from the start address of the selected address information to the end address of the selected address information, and then repeatedly reading the original waveform sample from the loop start address of the selected address information to the end address of the selected address information to thereby provide the variational waveform based on said original waveform sample.

15. A method of preparing a set of start addresses in an address memory used for variably reading one waveform sample from a waveform memory, comprising the steps of:

storing the waveform sample in the waveform memory;

detecting a plurality of rising points involved in the waveform sample and arranged sequentially from a top rising point to subsequent rising points;

selecting a predetermined number of rising points sequentially from the top one to subsequent ones among the detected rising points; and storing a predetermined number of start addresses corresponding to said predetermined number of the selected rising points into the address memory.

16. A method of producing variational waveform based on an original waveform sample composed of a series of digital values stored at sequential addresses of a waveform memory, comprising the steps of:

storing a plurality of address information selectively utilized to read out a desired variational waveform of the original waveform sample from the waveform memory;

allocating said plurality of said address information to a plurality of input members;

graphically displaying the sequential addresses of the original waveform sample; and detecting when one of the input members is operated for graphically indicating the address information allocated to the operated input member on the graphically displayed sequential addresses.

17. An apparatus for preparing a set of start addresses in an address memory used for variably reading one waveform sample from a waveform memory, comprising:

a detector coupled to the waveform memory adapted to detect a plurality of rising points involved in the waveform sample and arranged sequentially from a top rising point to subsequent rising points; and a selector coupled to said detector adapted to select a predetermined number of rising points sequentially from the top one to subsequent ones among the detected rising points, wherein a predetermined number of start addresses corresponding to said predetermined number of the selected rising points is stored into the address memory.

18. A machine readable medium for use in a music apparatus having a processor, a waveform memory and an address memory, the medium containing program instructions executable by the processor for causing the music apparatus to perform a process for preparing a set of start addresses in the address memory used for variably reading one waveform sample from the waveform memory, comprising the steps of:

storing the waveform sample in the waveform memory;

detecting a plurality of rising points involved in the waveform sample and arranged sequentially from a top rising point to subsequent rising points;

selecting a predetermined number of rising points sequentially from the top one to subsequent ones among the detected rising points; and storing a predetermined number of start addresses corresponding to said predetermined number of the selected rising points into the address memory.

19. An apparatus for producing a variational waveform based on an original waveform sample composed of a series of digital values stored at sequential addresses of a waveform memory, comprising:

an address memory adapted to store a plurality of address information selectively utilized to read out a desired variational waveform of the original waveform sample from the waveform memory;

an allocating section coupled to said address memory adapted to allocate said plurality of said address information to a plurality of input members;

a display adapted to graphically display the sequential addresses of the original waveform sample; and a detector coupled to said input members adapted to detect when one of the input members is operated for graphically indicating the address information allocated to the operated input member on the graphically displayed sequential addresses.

20. A machine readable medium for use in a music apparatus having a processor and a waveform memory, the medium containing program instructions executable by the processor for causing the music apparatus to perform a process for producing a variational waveform based on an original waveform sample composed of a series of digital values stored at sequential addresses of the waveform memory, comprising the steps of:

storing a plurality of address information selectively utilized to read out a desired variational waveform of the original waveform sample from the waveform memory;

allocating said plurality of said address information to a plurality of input members;

graphically displaying the sequential addresses of the original waveform sample; and detecting when one of the input members is operated for graphically indicating the address information allocated to the operated input member on the graphically displayed sequential addresses.

* * * * *